United States Patent [19]
Wu et al.

[11] Patent Number: 5,617,533
[45] Date of Patent: Apr. 1, 1997

[54] SYSTEM AND METHOD FOR DETERMINING WHETHER A SOFTWARE PACKAGE CONFORMS TO PACKAGING RULES AND REQUIREMENTS

[75] Inventors: Grace-Ann C. Wu, Sunnyvale; Mark B. McCall, San Carlos; Ella Raney, Los Altos; Overcomer Wu, San Jose, all of Calif.

[73] Assignee: Sun Microsystems, Inc., Mountain View, Calif.

[21] Appl. No.: 322,604

[22] Filed: Oct. 13, 1994

[51] Int. Cl.$^6$ ............................. G06F 11/00; G06F 11/30
[52] U.S. Cl. ................................ 395/183.14; 395/183.01
[58] Field of Search .................... 395/183.14, 183.01, 395/183.13

[56] References Cited

U.S. PATENT DOCUMENTS

| | | | |
|---|---|---|---|
| 4,658,093 | 4/1987 | Hellman | 380/25 |
| 4,989,145 | 1/1991 | Kyushima | 364/419 |
| 4,994,966 | 2/1991 | Hutchins | 364/419 |
| 5,022,028 | 6/1991 | Edmonds et al. | 371/25.1 |
| 5,084,813 | 1/1992 | Ono | 395/1 |
| 5,133,063 | 7/1992 | Naito et al. | 395/500 |
| 5,423,023 | 6/1995 | Batch et al. | 395/500 |
| 5,442,714 | 8/1995 | Iguchi | 382/144 |

FOREIGN PATENT DOCUMENTS 0600608  6/1994  European Pat. Off. .

OTHER PUBLICATIONS

"9391/9392 RAMAC Array DASD Service Guide", Document Number SY27–7505–00, IBM Tech. writing and Editing Services, Sep. 14, 1994, pp. 5.23–5.33.

*System V Application Binary Interface*, Unix Software Operation, AT&T, Published by Prentice–Hall, Inc. (1990), pp. 1–1 –2–17.

*Primary Examiner*—Hoa T. Nguyen
*Attorney, Agent, or Firm*—Blakley Sokoloff Taylor & Zafman

[57] ABSTRACT

A system and method for auditing software packages in a multi-release environment is provided. The audit system reads one or more external files that specify which packaging rules apply to a particular target software package. The audit system also reads package information files of the target software package. The package information files specify the form and content of the target software package. The audit system analyzes the information contained in the package information files to determine whether the target software package conforms with the specified packaging rules. The packaging rules may include rules relating to conflicts between software packages. Under these circumstances, the audit system retrieves information about the software packages against which the target software package is to be compared before performing the audit. The audit system may compare the target software package against another software package, or against a database which contains information about numerous other packages. The audit system checks the detected packaging rule violations against exceptions specified in the external files. Rule violations that are permitted by the specified exceptions are filtered from the error list. The audit system generates an audit report that indicates which rules, if any, were violated, and the severity level of each rule violation. The audit system may optionally generate exception information to be used in subsequent audit operations based on all or portions of the audit report. If the target software package passes the audit operation, the database may be updated to reflect the target software package.

20 Claims, 4 Drawing Sheets

SYSTEM AND METHOD FOR DETERMINING WHETHER A SOFTWARE PACKAGE CONFORMS TO PACKAGING RULES AND REQUIREMENTS

FIELD OF THE INVENTION

The present invention relates to a system and method for analyzing a software package, and more specifically, to a system and method for determining whether a software package conforms to a plurality of release-specific packaging rules.

BACKGROUND OF THE INVENTION

The increased complexity of modern computer systems often results in an increased quantity of software modules per system and an increased dependency between the software modules on a system. As a result, it has become difficult to avoid conflicts between software modules and ensure that the software modules will perform as expected. The problem of software conflicts is exacerbated when different software modules for a single product are being simultaneously developed at different sites and/or by different companies, and the fact that there may be multiple releases being simultaneously developed that have slightly different packaging requirements. The term software module, as used herein, refers to both computer programs, sections of a program and files used by computer programs.

To avoid software conflict problems, certain standards have been developed which define how software should be packaged (i.e. the form in which software should be released). For example, AT&T has developed application binary interface (ABI) standards suggesting rules for packaging software that runs on the System V, release 4 of UNIX (UNIX SVR4). The ABI standards for UNIX SVR4 may be found in AT&T, SYSTEM V: APPLICATION BINARY INTERFACE, Prentice-Hall, Inc. (1990). The standards consist of a set of rules that dictate how software modules should be packaged and named.

On certain platforms, numerous standard packaging tools have been developed. For example, an install program is available that will install any UNIX SVR4 package that conforms to industry packaging standards. Therefore, conformance with industry packaging standards has the additional benefit that it allows use of standard packaging tools.

In addition to the industry standards, individual companies may have their own software packaging standards. A company's packaging rules may supplement the industry standards or replace them. Further, a company may adopt customized rules that only apply to one release of a product, to all releases of a product, or to a single software package within a product. By conforming to these rules, software developers increase the likelihood that the software modules within their package will interact properly with both other software modules within the package and software modules already existing on the target computer system.

Under certain circumstances, a software developer may determine that a particular product, release, package or file should be exempt from a given rule. For example, a rule may state that executable files should be located in a subdirectory named "bin". A product specific exception to the rule may be appropriate if the developer decides that the executable files for a particular Product X should be located in a subdirectory named "executables". A release specific exception to the rule may be appropriate if the developer decides that the executable files for Product X should be located in "executables" for the beta release of Product X, but located in "bin" for all other releases of Product X. A package specific exception to the rule may be appropriate if the developer decides that the executable files that belong to a Package Y within Product X should be located in "executables", but that all other executables files within Product X should be located in "bin ". A file specific exception to the rule may be appropriate if the developer decides that one particular executable file should be located in "executables", while all others should be located in "bin ".

Under some circumstances, it may be desirable that all files with a particular name should be exempt from a given rule, but that the rule should apply to all other files in the package. For example, a general file-naming rule may prohibit the use of duplicate names. However, it has become customary to include information about changes which were made after the printing of the user's manual in a file named "readme". Thus, various files entitled "readme" may exist in a system, or even in a particular software package. As a result, all files with the name "readme" must be exempt from the duplicate name prohibition rule.

In light of the foregoing, the quantity of packaging rules which apply to any given software release may be significant. For example, there may be multiple layers of rules (industry standard rules, vendor specific rules, release specific rules and package specific rules) as well as multiple layers of exceptions to those rules (vendor specific exceptions, release specific exceptions, package specific exceptions, rule specific exceptions and file specific exceptions).

With such a complex packaging role scheme, it becomes difficult for a vendor to verify the conformity of ("audit") its software packages. The auditing problem becomes even more difficult when software modules for a single package are being simultaneously developed at multiple sites around the world.

In the past, vendors have attempted to enforce packaging rules by designating one or more employees as packaging rule experts. These packaging rule experts must memorize all layers of the rules and determine if and when exceptions to the rules should apply. This approach has a variety of problems, including inefficient human resource management and human error.

Another approach to enforcing packaging rules involves the use of script files. According to this approach, a software programmer develops a script file which, when executed, analyzes a release to determine if the packages within the release conform to packaging rules. The script file contains routines for checking the release for conformity of rules. Unfortunately, the script file must constantly be modified to reflect any variation in the rules or exceptions that apply to any given audit operation.

For example, if a new rule applies to a release, then a routine which checks for conformity to the new rule must be added to the script file. If a release is exempt from a particular rule, then the script file must be modified so that the routine corresponding to the rule is not executed. If a package within a release is exempt from a particular rule, then the routine corresponding to the rule must be modified to ignore errors caused by the particular package. If a file within a release is exempt from a particular rule, then the routine corresponding to the rule must be modified to ignore errors caused by the particular file.

Because script files must be modified to reflect rule/exception variations, it is common for multiple versions of a script file to simultaneously exist, where each version has been customized for a particular audit operation. Thus, the script file approach has the disadvantage that it is difficult to track and control, and virtually impossible to maintain and debug multiple customized script files. Further, the development and modification of script files requires a relatively high degree of programming skill. This could lead to a variety of problems. For example, those who have the responsibility of determining which rules and exceptions apply to a release may not have the requisite programming skills to implement the modifications required to audit the release. Further, attempts by those without the requisite programming skills to implement modifications may jeopardize the integrity of the script file, and therefore the results of the audit operation. If procedural safeguards are adopted to ensure proper development, testing, and version control of script files, the human resources required by such a system would be considerable.

Based on the foregoing, it is desirable to provide a more efficient and flexible system and method for determining whether a software package conforms to industry standard packaging rules. It is also desirable for the system and method to determine whether a software package conforms to company-specific and release-specific packaging rules. It is also desirable that the system and method allow for package-specific and release-specific exceptions to the packaging rules. Further, it is desirable to provide a system in which conformity may be determined automatically, and in which a record of any rule violations is generated automatically. Finally, it is desirable to provide a system that does not require extensive revision before it can be used with different packages and/or different releases with different sets of applicable packaging rules and exceptions.

SUMMARY OF THE INVENTION

According to one embodiment of the invention, a system for determining whether a target software package conforms to a plurality of release-specific packaging rules is provided. The system generally includes an applicable information retrieval unit, an exception analyzer, a target package information retrieval unit, a package analyzer, and an audit report generation unit.

The applicable information retrieval unit retrieves rule information from at least one external input file that resides external to the audit system. The rule information indicates the packaging rules that apply to the target package. The target package information retrieval unit retrieves information describing the target software package from at least one target package information file. The package analyzer is operatively coupled to the applicable information retrieval unit and the target package information retrieval unit. The package analyzer determines whether the target software package conforms to plurality of package rules based on the plurality of packaging rules and the information describing the target software package.

The audit report generation unit is operatively coupled to the package analyzer. The audit report generation unit generates data indicative of whether the target software package conforms to the plurality of packaging rules.

According to another aspect of the invention, the plurality of packaging rules includes a set of single-package rules. Single-package rules are packaging rules which govern the form and content of packages, but which do not relate to conflicts between packages. For example, a rule regarding the format of a package file or characters that may be used for certain variables are a single-package rules.

The package analyzer includes a single-package rule analyzer which is operatively coupled to the applicable information retrieval unit and the target package information retrieval unit. The single-package rule analyzer determines whether the target software package conforms to the set of single-package rules based on the set of single-package rules and the information describing the target software package.

According to another aspect of the invention, the plurality of packaging rules includes a set of inter-package rules. Inter-package rules are rules which relate to conflicts between packages. The system further includes an external package information retrieval unit that retrieves information describing at least one software package other than the target software package. The package analyzer includes an inter-package rule analyzer which is operatively coupled to the applicable information retrieval unit, the target package information retrieval unit and the external package information retrieval unit. The inter-package rule analyzer determines whether the target software package conforms to the set of inter-package rules based on the set of inter-package rules, the information describing the target software package and the information describing the software package other than the target software package.

According to yet another aspect of the invention, the applicable information retrieval unit retrieves exception information from at least one exception file. The system further includes an applicable exception unit that is operatively coupled to the o applicable information retrieval unit. The applicable exception unit determines exceptions to the plurality of packaging rules based upon the exception information. The audit report generation unit generates data to indicate nonconformance to a packaging rule of the plurality of packaging rules if the packaging rule is violated by the target software package and violation of the packaging rule is not excluded by any of the exceptions.

According to another aspect of the invention, the audit report generation unit generates data indicative of which rules of the plurality of packaging rules are violated by the target software package and are not excluded by any of the exceptions when the target software package does not conform to the plurality of packaging rules. The audit report generation unit may also generate data indicating a severity classification of any violations of the plurality of packaging rules. The data generated may also include a summary of errors by severity (e.g. warning errors=5, critical errors=3). Optionally, the audit report generation unit may also generate data indicative of the errors that occurred but were filtered out because they were covered by applicable exceptions.

According to another aspect of the invention, the external package information retrieval unit retrieves the information describing at least one software package other than the target software package from a software package database containing information on a plurality of software packages other than the target software package. The system includes a software package database update unit which can be used to update the software package database to include information about the target software package.

According to another aspect of the invention, each packaging rule of the plurality of packaging rules has an associated severity of violation. The package analyzer determines that the target software package conforms to the plurality of packaging rules if and only if the target software package does not violate any rule of the plurality of packaging rules having a severity level greater than a predetermined severity level. Conformity with the rules may be used as a criteria to allow updates to the package databases.

According to another embodiment of the invention, a method for determining whether a target software package conforms to a plurality of packaging rules is provided. According to the method, rule information is retrieved from at least one external input file. The plurality of packaging rules is determined based on the rule information. Information describing the target software package is retrieved from at least one target package information file. It is then determined whether the target software package conforms to the plurality of packaging rules based on the plurality of packaging rules and the information describing the target software package. Data indicative of whether the target software package conforms to the plurality of packaging rules is generated.

The external input files may include exception files which specify exceptions to packaging rules as well as external input files which specify packaging rules. Preferably, various types of exceptions are supported. For example, entries in an exception file may specify a product specific exception, a release specific exception, a rule specific exception or a file specific exception. Entries may contain a wildcard character to designate the audit rules, packages or files to which an exception covers.

According to an aspect of the invention, the method includes the step of generating an exception file based on the data indicative of whether the target software package conforms to the plurality of packaging rules. The data indicative of whether the target software package conforms to the plurality of packaging rules may be, for example, all or a portion of the output of an audit report generator unit. The exception file includes exception information corresponding to one or more packaging rules that was violated by the target software package.

According to another aspect of the invention, the plurality of release-specific packaging rules includes a set of internally implemented rules. The step of determining whether the target software package conforms to the set of package rules is performed by an audit system, and includes the step of invoking routines that are hard-coded in the audit system. The plurality of packaging rules may also include a set of externally-implemented rules. The step of determining whether the target software package conforms to the plurality of packaging rules includes the step of invoking routines implemented in software modules external to the audit system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for verifying the conformity of a software package to a plurality of packaging rules is described. In the following description, for the purposes of explanation, numerous specific details such as software tools, platforms, operating systems and programming languages are set forth in order to provide a thorough understanding of the present invention. However, the present invention may be practiced without these specific details. In other instances, well-known structures and devices are shown in block diagram form in order to avoid unnecessarily obscuring the present invention.

Figure 1:
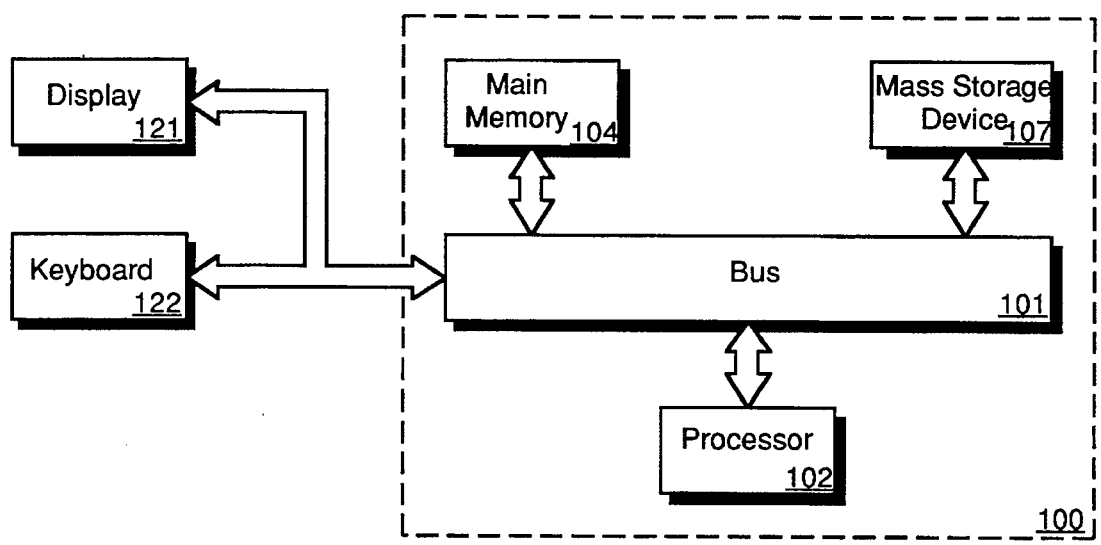
FIG. 1 illustrates a block diagram of a computer system upon which an embodiment of the present invention may be implemented.

Referring to FIG. 1, a computer system 100 upon which the preferred embodiment of the present invention can be implemented is shown. Computer system 100 comprises a bus or other communication means 101 for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102.

The present invention is related to the use of computer system 100 to audit software packages. In the currently preferred embodiment, computer system 100 is configured to run the UNIX System V operating system. Computer system 100 audits software packages by executing a series of instructions which cause computer system 100 to analyze the software packages, detect nonconformities with the applicable packaging rules and generate an audit report.

Figure 2:
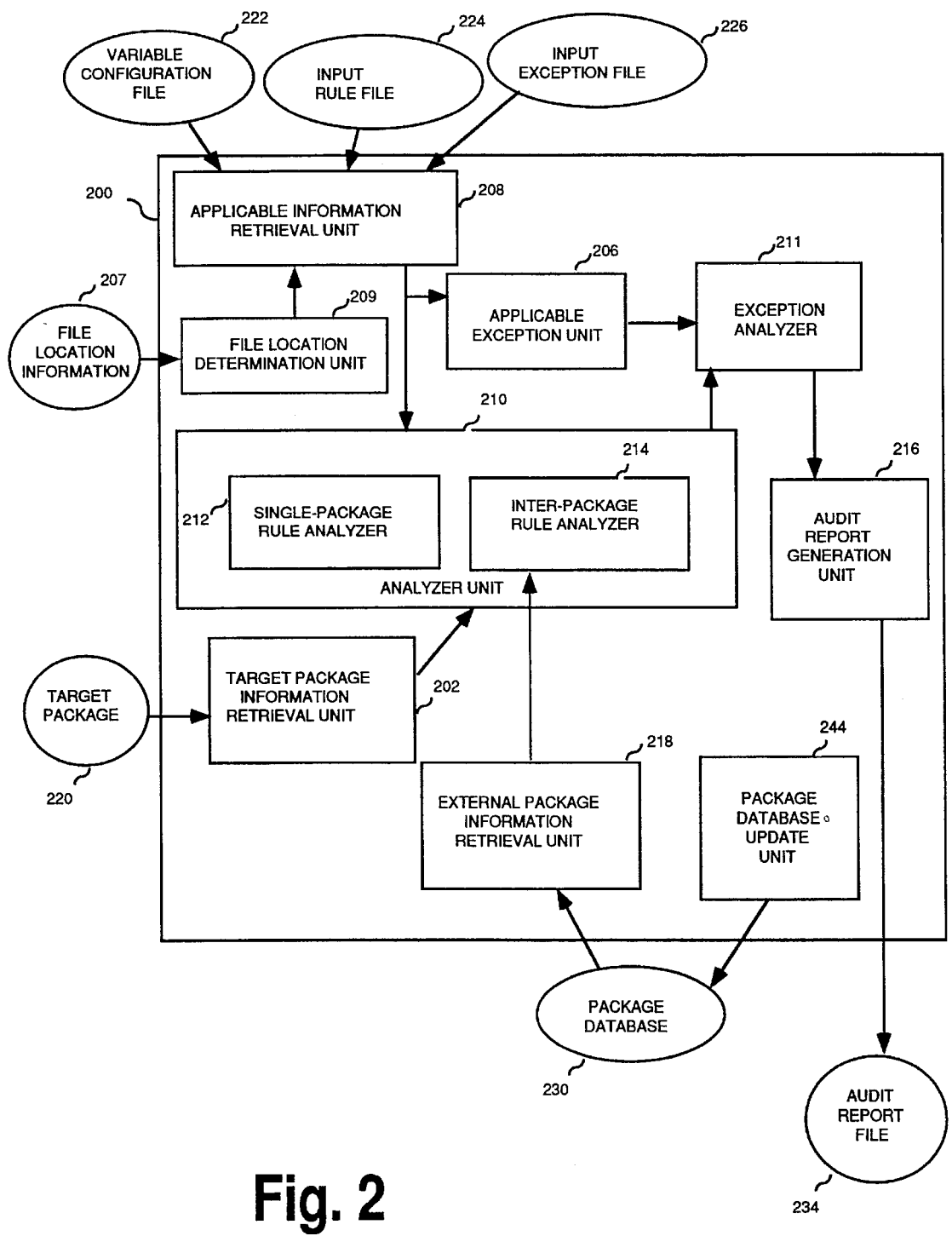
FIG. 2 illustrates a functional block diagram of an auditing system according to one embodiment of the present invention.

Referring now to FIG. 2, it illustrates a functional block diagram of a software package audit system 200. In general, audit system 200 analyzes the form and content of one or more software packages, and contents between packages, to determine if the software packages conform to all of the industry standard packaging rules, company-specific packaging rules, release-specific packaging rules, and/or package-specific packaging rules that apply to the target software packages. Audit system 200 then generates an audit report file 234 that indicates which rules, if any, are (1) violated by the target software package and (2) not covered by any applicable exception. An exemplary audit report file is illustrated in Appendix III.

For the purposes of explanation, the audit of a single software package (the "target software package 220") shall be described. However, audit system 200 may be used to simultaneously perform an audit of any number of software packages. For example, audit system 200 may be used to determine whether all packages within a software product conform to the applicable packaging rules prior to a release of the software product.

PACKAGING PROBLEMS

Most packaging problems fall into one of two categories: single-package problems and inter-package problems. Inter-package problems occur when the target software package conflicts in some manner with another software package, or will not function properly due to the absence of another software package. For example, many software packages require the services of software modules in other software packages to function properly. A software package will not function properly if the software modules required by the software package are not present on a system that attempts to execute the software package. For example, a software module produced by one developer (module X) may require a software module produced by a different developer (module Y). Module X will not function properly (or at all) on a given system if module Y is not present on the system when module X is executed.

Certain types of inter-package problems may even occur between unrelated and independent software packages. For example, two software packages may specify executable files with the same base name. Under these circumstances, an attempt to execute one of the identically-named software modules may actually invoke the other of the identically-named software modules.

A related inter-package problem may occur if identically-named software modules are stored in identically-named subdirectories. The first-installed software module may be overwritten by the later-installed software module.

In addition, two software packages may both depend on a common software module or directory, but expect the common software module or directory to have different attributes. For example, package X may require module Y to be read-only, while package Z may require module Y to be read-write.

Single-package problems include all problems that do not involve software packages other than the target software package. For example, the use of invalid symbols in a file name is a single-package error. Similarly, file names that are too long, too short, or duplicative cause single-package errors. Companies may also require that a package specify certain specific macro values or contain certain copyright files. Different macro values or the absence of the required copyright files may cause a single-package error.

THE COMPONENTS OF A PACKAGE

The specific components of a package will vary from platform to platform based on the differences in the package standards developed for each platform. In the following discussion, the form and content of packages on the UNIX SVR4 platform shall be described. However, this platform is merely exemplary. The present invention is not limited to any particular platform or package format.

A package typically includes one or more target package information files which specify the contents of the package. For example, a package in UNIX SVR4 contains a package characteristics file ("pkginfo"), a package contents description file ("pkgmap"), a previous version file ("compver"), a software dependency file ("depend"), a space file ("space") and a copyright file ("copyright"). These files provide the information necessary to determine whether the corresponding software package conforms with the packaging rules.

The package characteristics file is a text file that describes the characteristics of the package, along with information that helps control the flow of installation. The pkginfo file includes, for example, text that specifies the package name, tokens that indicate the architecture associated with the package, text that specifies the current version of the software package and a list of the categories under which the package may be installed. A developer may require the pkginfo file to include additional information, such as the pathname to a default directory where relocatable files may be installed, an electronic address where help information about the package is available, etc.

The pkgmap file is a text file that provides a complete listing of the package contents. Each entry in pkgmap describes a single object file. An object file may be, for example, a shell script, an executable object, a data file or a directory. The entry for a particular object file contains a variety of information about the file, including the file type, the pathname where the object will reside on the target machine, the owner of the file, the group to which the file belongs, the size of the file, the checksum of the file contents, and the last time the file was modified.

The depend file is a text file that specifies information about the software dependencies for a particular package. Each entry in the depend file specifies a software package and whether (1) the target software package requires the specified software package, (2) the target software package is required by the specified software package, or (3) the target software package is incompatible with the specified software package. Optionally, an entry may also specify the architecture and version of the specified software package.

The compver file is a text file which specifies previous versions of the target software package with which the target software package is upward compatible. The space file is a text file which specifies information about the disk space requirements for the target environment. The copyright file is a text file which provides a copyright notice for the package.

In addition to these package information files, a package includes a relocatable directory tree containing the actual files in their appropriate locations within the directory tree.

THE AUDIT SYSTEM

Referring again to FIG. 2, audit system 200 includes a file location determination unit 209, a target package information retrieval unit 202, an applicable exception unit 206, an applicable information retrieval unit 208, an analyzer unit 210, an exception analyzer 211, an audit report generation unit 216 and an external package information retrieval unit 218. Analyzer unit 210 includes a single-package rule analyzer 212 and an inter-package rule analyzer 214.

As explained above, many layers of rules and exceptions may apply to a particular software package. The rules which apply to any given target package may include rules which are hard-coded in the same software which implements audit system 200 ("internally-implemented rules") and rules which are implemented in software modules separate from audit system 200 ("externally-implemented rules"). All of the rules and exceptions which apply to a given target software package, whether they are internally or externally implemented, are referred to hereafter as "applicable rules".

The rules and exceptions that apply to a given target package are specified in external input files that exist separate from and external to audit system 200, such as input rule file 224 and input exception file 226. In the preferred embodiment, these external input files are user-modifiable text files that contain a list of rule identifiers (rule ids). Each rule id identifies an applicable audit rule. Appendix I and Appendix II contain the listings of exemplary rule files and exception files, respectively.

Input rule file 224 contains a list of the rules with which the target software package must conform. Optionally, this list may be broken down into two files: one external input file containing a list of the single-package rules that apply to the target software package, and another external input file containing a list or the inter-package rules that apply to the target software package.

In Appendix I, the rules applicable to a particular audit operation have been separated into two files. The first file specifies the inter-package rules that will be applied in the audit operation. In the preferred embodiment, the names of files which specify inter-package rules have a common suffix, such as ".ipmod". The second file specifies single-package rules that will be applied in the audit operation. The names of files which specify single-package rules have a common suffix, such as ".spmod", to identify them as single-package rule files and to distinguish them from inter-package rule files.

In the exemplary rule file of Appendix I, each line consists of an audit rule identifier which identifies an applicable audit rule. Preferably, the audit rule identifiers are constructed to convey information about the rule to which they correspond. For example, each portion of the audit rule identifier "pkgmap_basename_ip_rt_1" conveys information about the corresponding rule. The "pkgmap" portion of the audit rule identifier indicates the package information file that contains information required to determine whether a package conforms to the rule. The "basename" portion of the audit rule identifier indicates that the corresponding rule relates to the basename of files within the target package. The "ip" portion of the audit rule identifier indicates that the rule is an inter-package rule. The "rt" portion of the audit rule identifier indicates the source of the corresponding rule. For example, "rt" specifies rules established by a particular group ("release technology group") within a company, "abi" specifies an industry-standard rule, "sun" specifies a company-specific rule, etc. The audit rule identifier ends in a number to distinguish between two or more rules in which all of the other name portions are identical (e.g. "depend_type_sp_abi_1", "depend_type_sp_abi_2" and "depend_type_sp_abi_3".

Input exception file 226 contains a list of exceptions to the rules which apply to the target software package. Optionally, this list may be broken down into two files: one exception file containing a list of specific exceptions (exceptions which apply only to specific files in the target package) and another exception file containing a list of global exceptions (exceptions which may be configured to apply to combinations of many different files and packages). By specifying the exceptions in separate files in this manner, the performance of audit system 200 may be improved. Specifically, the exception file containing the file specific exceptions may be processed by a relatively faster input routine that does not fully support wildcard characters, while the exception file containing the list of global exceptions may be processed by a relatively slower input routine that does support wildcard characters.

The ability to specify global exceptions is especially useful when an exception applies to a large or general group of errors. Without the ability to specify global exceptions, one would have to create numerous specific exceptions to provide the same coverage. The creation of numerous specific exceptions would not only be more difficult and time consuming, it would also result in a much larger exception file.

Appendix II contains two exemplary exception files. The first exception file identifies specific exceptions, while the second exception file identifies global exceptions. Preferably, exception files that identify specific exceptions have a common filename suffix, such as ".ex", while exception files that identify global exceptions have a different common suffix, such as ".glex".

In the illustrated exception files, each entry has the format:

audit_id|groupname|pkgid|full_path

The "audit_id" portion of an exception entry is the name of the audit rule to which an exception is being made. Preferably, exception files use the same audit identifiers as rule files to identify any given audit rule. The groupname portion of an exception entry is a string to indicate related groups of exception entries. Each related group of exception entries has a unique group name.

The pkgid portion of an exception entry identifies the specific package to which the particular exception applies. For example, if a conflict between one file in a "SUNWa" package and one file in a "SUNWb" package is exempt from a particular inter-package rule, then an exception group consisting of two entries, one specifying SUNWa and the other specifying SUNWb", would specify the desired exception. Such an exception entry group would not cover the same error if it occurred between any packages other than SUNWa and SUNWb.

The full_path portion of an exception entry is the full pathname (including the filename) of the files to which the exception applies. For example, an exception entry group consisting of the entries pkgmap_basename_ip_rt_5|s30|PKGa|/usr/read.me pkgmap_basename_ip_rt_5|s30|PKGb|/usr/include/read. me indicates that two files with the file name "read.me", one of which is in the "usr" subdirectory of a package "PKGa ", the other of which is in the "usr/include" subdirectory of a package "PKGb", are, with respect to each other, exempt from the rule identified by pkgmap_basename_ip_rt_5. This exception is very specific. For example, it does not cover violations of rule pkgmap_basename_ip_rt_5 that occur between "PKGa/usr/read.me" and any files other than "PKGb/usr/include/read.me ", or between "PKGb/usr/include/read.me" and any files other than "PKGa/usr/read.me".

Under certain circumstances, it may be desirable to exempt certain files from certain rules without regard to their filenames, the specific directories in which they are located and/or the package in which they reside. It also may be desirable to exempt certain files from entire categories of rules. To specify these types of exceptions, a wildcard character, such as an asterisk, is used in exception entries. The examples shown in Table 1 illustrate how a wildcard character may be used in an exception entry: Multiple wildcard characters can be combined in a single exception entry.

TABLE 1

| ENTRY: | COVERS: |
| --- | --- |
| pkgmap_basename_ip_5\|s30\|PKGa/usr/read.me | the audit rule "pkgmap_basename_ip_rt_5" for the file "read.me" located in the directory "/usr" in the package "PKGa". |
| pkgmap_basename_*\|s30\|PKGa/usr/read.me | all pkgmap_basename audit rules for the file "read.me" located in |

TABLE 1-continued

| ENTRY: | COVERS: |
| --- | --- |
|  | the directory "/usr" in the package "PKGa" |
| *ls30lPKGal/usr/read.me | all audit rules for the file "read.me" located in the directory "/usr" in the package "PKGa" |
| pkgmap_basename_ip_5ls30l*l/usr/read.me | the audit rule "pkgmap_basename_ip_rt_5" for the file "read.me" located in the directory "/usr" in any package |
| pkgmap_basename_ip_5ls30lPKGal*/read.me | the audit rule "pkgmap_basename_ip_rt_5" for the file "read.me" located in any directory in the package "PKGa" |
| pkgmap_basename_ip_rt_5ls30lPKGal/usr/* | the audit rule "pkgmap basename_ip_rt_5" for any file located in the directory "/usr" in the package "PKGa" |
| pkgmap_basename_ip_rt_5ls30lPKG*l/usr/read.me | the audit rule "pkgmap_basename_ip_rt_5" for the file "read.me" located in the directory "/usr" in any package that begins with "PKG" (this feature may be helpful to cover multiple versions of the same package, where each package version begins with the same characters) |
| pkgmap_basename_ip_rt_5ls30lPKGal/usr/*/read.me | the audit rule "pkgmap_basename_ip_rt_5" for the file "read.me" located in the directory "/usr" or any subdirectory thereof in the package "PKGa" |
| pkgmap_basename_ip_rt_5ls30lPKGal/usr/read. | the audit rule "pkgmap_basename_ip_rt_5" for any files beginning with "read." located in the directory "/usr" in the package "PKGa" |

A variable configuration file 222 may be used in addition to the external input files. Variable configuration file 222 is a user-modifiable text file which specifies values to be used in the application of certain rules. For example, a rule may specify that all package names must end with a suffix that reflects the architecture for which the target package has been developed. Variable configuration file 222 may specify the appropriate suffix for each possible architecture allowed for that release.

File location determination unit 209 determines the location of the relevant external input files based on file location information 207 stored external to audit system 200. File location information 207 may include, for example, the value of certain environmental variables and user input (e.g. command line switches). Once file location determination unit 209 determines the location of the relevant external input files, information is retrieved into audit system 200 from the files. Specifically, the applicable rule and exception information front input rule file 224, input exception file 226, and variable configuration file 222 are retrieved into audit system 200 by applicable information retrieval unit 208.

Because the external input files are maintained separate and external to audit system 200, audit system 200 itself need not be modified for every release of every product that it audits. Unlike script files, audit system 200 need not be modified to analyze packages, products or releases that are governed by different applicable rules and exceptions. Rather, audit system 200 is simply given different input files when different rules apply. In addition, the external input files that specify the applicable rules and exceptions for a given target product, release or package serve as a record of the rules that were applied to and the exceptions that where made for the target product, release or package. This information may be useful for determining the source of an error if software package conflicts occur.

Target package information retrieval unit 202 reads information related to the form and content of target software package 220 from the target package information files of target software package 220. As explained above, this information includes the names, attributes, and dependencies of the files in the target package. Target package information retrieval unit 202 then transmits the information about target software package 220 to analyzer unit 210, which includes single-package rule analyzer 212 and inter-package rule analyzer 214.

Both single-package rule analyzer 212 and inter-package rule analyzer 214 analyze the form and content of the target software package 220 to determine whether the form and content of the target software package 220 conform with the packaging rules specified in the external input file. Specifically, single-package rule analyzer 212 determines whether the target software package 220 conforms with rules specified in the external input file which address single-package problems ("single-package rules"), and inter-package rule analyzer 214 determines whether target software package 220 conforms with rules specified in the external input file which address inter-package problems ("inter-package rules").

CHECKING CONFORMANCE WITH SINGLE-PACKAGE RULES

The information required by single-package rule analyzer 212 to enable single-package rule analyzer 212 to check the conformity of target software package 220 to the applicable single-package rules includes information about the form and content of target software package 220 and information about which single-package rules apply to the target software package 220.

Single-package rule analyzer 212 obtains information about the form and content of target software package 220 from target package information retrieval unit 202. Single-package rule analyzer 212 obtains information about which single-package rules are applicable from the applicable information retrieval unit 208.

Single-package rule analyzer 212 determines whether the target software package conforms to the applicable single-package rules by invoking routines which analyze the target package information to determine whether the form and content of the target software package violates any of the applicable single-package rules.

Externally-implemented rules are implemented in software modules external to audit system 200. If the external input files identify an externally-implemented rule as an applicable rule, then single-package rule analyzer 212 invokes the external software module which implements the externally-implemented rule. Similarly, if the external input files identify an internally-implemented rule as an applicable rule, then single-package rule analyzer 212 invokes the internal routine that corresponds to the applicable role.

Single-package role analyzer 212 sends data indicative of any single-package rule violations to exception analyzer 211. If any single-package rule is violated, exception analyzer 211 determines if an exception is made to the rule. Specifically, applicable exception unit 206 determines which exceptions apply to the target package based on the exception information retrieved by applicable information retrieval unit 208. Then, for each single-package rule violation identified by single package rule analyzer 212, exception analyzer 211 determines whether the rule violation is permitted by any of the exceptions identified by applicable exception unit 206. All errors permitted by an exception are filtered out of the error list.

CHECKING CONFORMANCE WITH INTER-PACKAGE RULES

Inter-package rule analyzer 214 requires similar information to check the conformity of the target package to inter-package rules as single-package rule analyzer 212 requires to check the conformity of the target package to single-package rules. Specifically, the information required by inter-package rule analyzer 214 to enable inter-package rule analyzer 214 to check the conformity of target software package 220 to the applicable inter-package rules includes information about the form and content of target software package 220 and information about which inter-package rules apply to the target software package 220.

Inter-package rule analyzer 214 obtains the information it requires in a similar manner as single-package rule analyzer 212. Specifically, inter-package rule analyzer 214 obtains information about the form and content of target software package 220 from target package information retrieval unit 202. Inter-package rule analyzer 214 obtains information about which inter-package rules are applicable from applicable information retrieval unit 208.

However, inter-package rules relate to conflicts between packages. Therefore, in addition to the information described above, inter-package rule analyzer 214 must also obtain information about the packages against which the target package is to be checked. In the preferred embodiment, information about the packages against which the target package will be checked is stored in a package database 230 that is stored external to audit system 200.

Package database 230 consists of one or more files, stored external to audit system 200, that contain "other package information." Other package information is information that describes one or more packages other than the target package 220. According to one embodiment, package database 230 consists of one or more actual database files. However, package database 230 need not be a commercial database. For example, package database 230 may simply be the package information files (e.g. pkginfo, pkgmap, etc.) of a package other than the target package.

External package information retrieval unit 218 retrieves the other package information from the package database 230 and supplies inter-package rule analyzer 214 with the information.

Inter-package role analyzer 214 determines whether the target software package conforms to the applicable inter-package rules by invoking routines which analyze the target package information in light of the other package information to determine whether the form and content of the target software package violates any of the applicable inter-package rules. If the external input files identify an externally-implemented rule as an applicable inter-package rule, then inter-package rule analyzer 214 invokes the external software module which implements the externally-implemented rule. Similarly, if the external input files identify an internally-implemented rule as an applicable inter-package rule, then inter-package rule analyzer 214 invokes the internal routines corresponding to the internally-implemented rule.

Inter-package rules may include, for example, rules relating to the dependencies between packages. For example, one rule may check to see that all of the packages required by the target package are present in the packages described in the package database 230. Another rule may check to see that none of the packages that are incompatible with the target package are present in the packages described in the package database 230. Another rule may check to determine that directories common to both the target package and the packages described in the package database 230 have identical attributes. Another rule may check to see that no executable file contained in the target package has the same basename as any executable file contained in the packages described in the package database 230.

The choice of which packages to check against the target package may depend on the needs of a particular user. For example, a developer will typically desire to check each package in a product against all other packages in the product before releasing the product. To perform this type of package verification, the developer would check each package involved in the release against a package database with information about all of the packages involved in the release.

As mentioned above, such the package database need not consist of actual database files. For example, a collection of the package information files from the packages involved in the release constitutes a package database with information about all of the packages involved in the release.

A developer may also desire to check a package developed for a particular platform against all packages previously developed for that platform. To perform this type of package verification, the developer would have to maintain a package database with information about all packages developed for the platform.

Some end users may only be interested in verifying that a particular package will not conflict with other packages on a particular computer system. This type of package verification may be performed by checking the target package against a package database containing information about all packages previously installed on the user's system.

Inter-package rule analyzer 214 sends data indicative of any inter-package rule violations to exception analyzer 211. If any inter-package rule is violated, exception analyzer 211 determines if an exception is made to the rule. As mentioned above, applicable exception unit 206 determines which exceptions apply to the target package based on the exception information retrieved by applicable information retrieval unit 208. For each inter-package rule violation identified by inter-package rule analyzer 214, exception analyzer 211 determines whether the rule violation is permitted by any of the exceptions identified by applicable exception unit 206. All errors permitted by an exception are filtered out of the error list.

ERROR DIAGNOSIS/ERROR REPORT GENERATION

If audit system 200 determines that a particular package does not conform to all of the applicable packaging rules, the developer of the software package must either modify the package to achieve conformity or determine that the rule violations are acceptable. To assist the developer, the audit system 200 preferably performs packaging error diagnosis as well as packaging error detection. That is, audit system 200 not only indicates that an error occurred, but also identifies the error. Specifically, exception analyzer 211 transmits data indicating the results of the analysis to audit report generation unit 216. This data not only specifies which rules where violated, but identifies the specific rules that were violated, and, where applicable, the file, name, or condition which caused the violation.

Audit report generation unit 216 may additionally generate a list of errors that were filtered in response to exceptions. This information may be reviewed from time to time to ensure that the exceptions are not broader than the developer intends them to be. For example, a user may add an entry to input exception file 226 to cover a particular violation of a packaging rule. However, if the entry defines the exception too broadly, then the exception may cover more than just the intended violation. Consequently, errors which should be flagged may be unknowingly filtered out of the error list.

Audit report generation unit 216 generates an audit report file 234 that documents the audit results. The report includes the package error diagnosis information that the audit report generation unit 216 receives front both single-package rule analyzer 2 12 and inter-package rule analyzer 214, as filtered by exception analyzer 211. In addition, audit report generation unit 216 classifies the violations by degrees of severity. For example, the presence of an invalid symbol in a file name may be classified as "critical", while the presence of more than one "readme" file may be classified as "warning".

Preferably, the severity level associated with each rule is specified in an external input file that is read by audit system 200. For example, each entry of input rule file 224 may specify a rule and the severity level of the rule. Optionally, the severity level of certain crucial rules may be hard-coded and non-modifiable. This option may be desired if, for example, company policy establishes that certain packaging rules should not be violated under any circumstances. Alternatively, a default severity level may be hard-coded, and the user may be allowed deviate from the default by specifying a different severity level in an external input file. For example, different severity levels may be indicated in the input rule file.

A target package is considered to conform to the applicable rules if and only if the target package does not violate any rules above a specified degree of severity. For example, a target package which violates only "warning" rules is considered to conform, while a target package which violates any "critical" rules is not considered to conform. Preferably, the criteria for passing may be raised toward the end of a release. For example, a developer may decide that all packages in a release may have to be free of any type of errors prior to actually shipping the release.

According to one embodiment, audit system 200 includes a package database update unit 244. Package database update unit 244 may optionally be used to update package database 230 with information about the form and content of the target package if the target package conforms to the applicable packaging rules. Consequently, when future target packages are analyzed by audit system 200, they are checked against the updated target software package 220 as well as the packages previously represented in package database 230.

Figure 3:
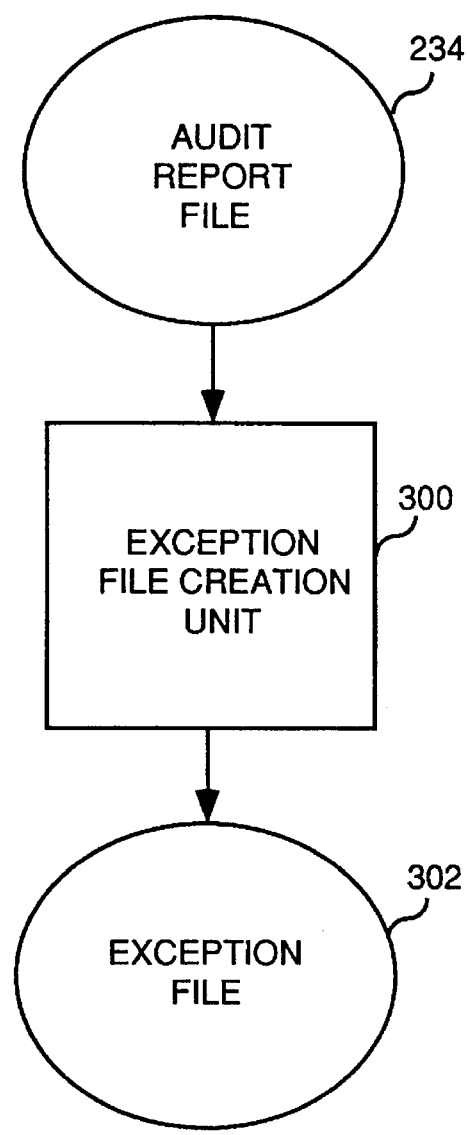
FIG. 3 illustrates a functional block diagram of an exception file creation unit according to an embodiment of the invention.

Referring now to FIG. 3, it illustrates a functional block diagram of an exception file creation unit 300. As mentioned above, when audit system 200 determines that a target package does not conform to its applicable rules, then the developer of the package should modify the package to achieve conformity and/or determine that the rule violations identified in the audit report file are acceptable.

If the rule violations are acceptable, then a developer must prepare an exception file 302 which specifies exceptions which cover the violated rules, or, if an exception file already exists, the developer must add entries to the exception file to cover the violated rules. In a subsequent audit of the target package, the new or updated exception file 302 is read by applicable information retrieval unit 208 along with any other external input files. The previously identified violations are covered by exceptions in the subsequent audit operation. Therefore, audit system 200 will determine that the target package conforms with its applicable rules.

Exception file creation unit 300 assists a developer when the developer determines that violations identified in an audit operation are acceptable by automatically generating the exception file 302 from the information contained in the audit report file 234. Specifically, exception file creation unit 300 reads all or a selected portion of the audit report file 234 and creates corresponding exception entries which cover the violations identified in the selected portion of audit report file 234. Exception file creation unit 300 then generates exception file 302 with data specifying the exceptions in the format required by applicable information retrieval unit 208. Alternatively, if an exception file 302 already exists, exception file creation unit 300 updates the existing exception file 302 by inserting entries which cover the errors that are indicated in the selected portion of audit report file 234.

Figure 4:
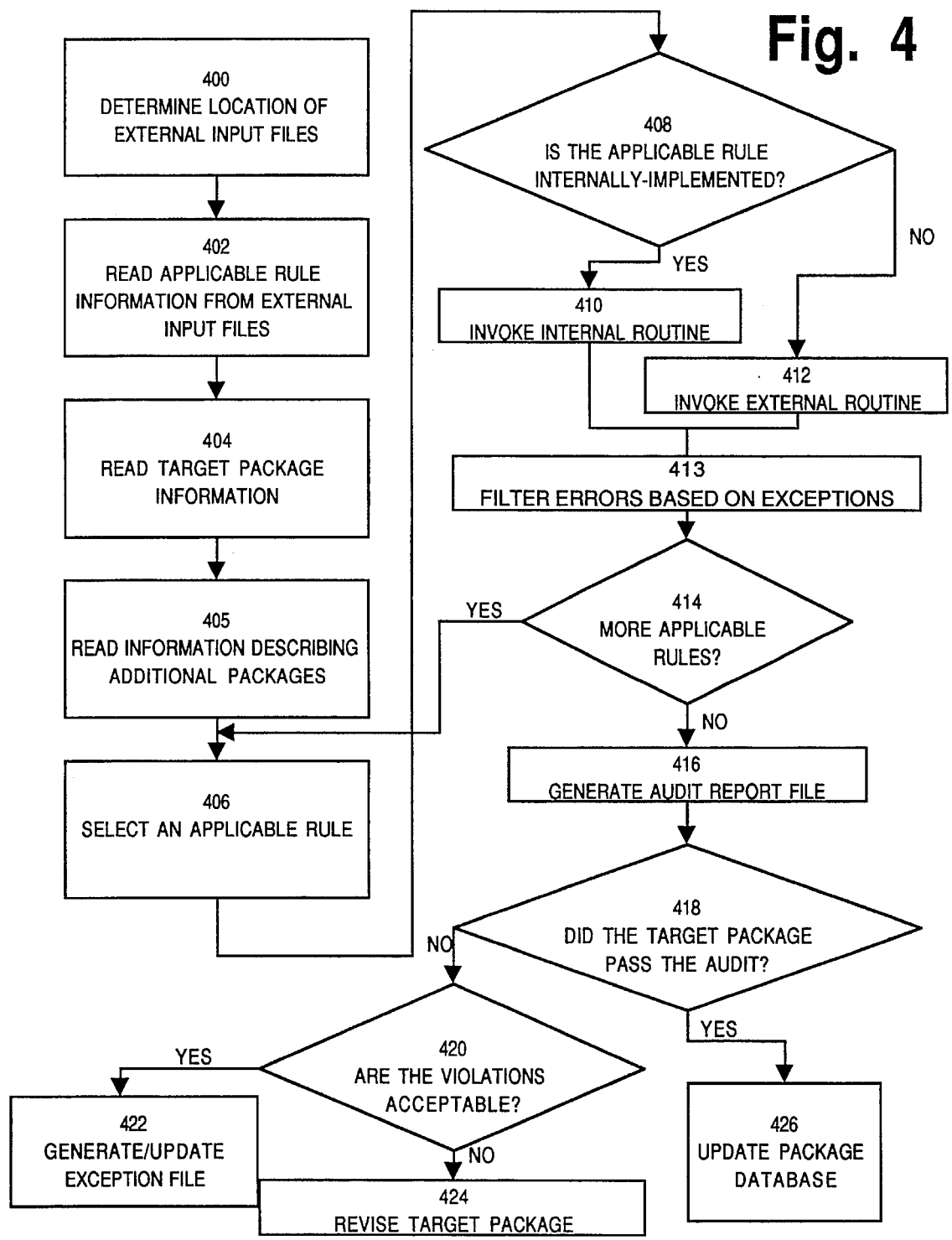
FIG. 4 illustrates a flow chart of the general steps for auditing a target package according to an embodiment of the invention.

Referring to FIG. 4, it illustrates a flow chart illustrating the general steps involved in an audit operation according to an embodiment of the invention. At step 400, audit system 200 determines the location of the external files that specify which rules and exceptions are applicable to the target package. This determination is made based on external information, such as the value of certain environmental variables and user input.

At step 402, applicable rule information is read from one or more external input files. As explained above, external input files include both files which specify the rules that apply to the target package and files which specify exceptions that apply to the target package. Applicable rules may include both internally-implemented rules and externally-implemented rules, as well as both single-package rules and interpackage rules.

At step 404, audit system 200 reads target package information. Target package information is information about the form and content of the target package, and is typically described in one or more package information files.

At step 405, audit system 200 reads information describing packages other than the target package. This information may be stored in a package database, which may be either actual database files or a collection of package information files. Note that this step is only necessary if at least one of the rules determined at step 402 is an inter-package rule.

Steps 406, 408, 410, 412, 413 and 414 constitute a loop that is repeated until all of the applicable rules have been processed. At step 406, an applicable rule is selected. At step 408 it is determined whether the selected rule is internally-implemented. If the selected rule is internally implemented, an internal routine corresponding to the rule is invoked at step 410. Otherwise, an external routine corresponding to the rule is invoked at step 412. The invoked routine checks the target package information to determine if the target package conforms to the selected rule. If an error is detected, audit system 200 determines whether the error is covered by error exceptions specified in the external input files. Errors which are covered by exceptions are filtered from the error list. At step 414, it is determined whether all of the applicable rules have been processed. If all of the applicable rules have been processed, control passes to step 416. Otherwise, control passes back to step 406.

At step 416, audit system 200 generates an audit report file. The audit report file lists all of the rules which are violated by the target package as well as the severity level of each rule violation. In addition, a separate audit report may be created which includes a list of all the errors that were detected but that were filtered in response to applicable exceptions. The audit report may also have a summary of the errors encountered. Such a summary may indicate, for example, the total number of errors encountered at each severity level.

At step 418, it is determined whether the target package passed the audit. The target package is considered to have passed the audit if the target package did not violate any rules above a specified severity level. If the target package did pass the audit, then control passes to step 426. Otherwise, control passes to step 420.

At step 426, a package database may be updated to include the information about the target package. This step is optional, and may vary based on a company's larger auditing scheme. According to one embodiment, the package database is updated whenever a package passes an audit, and every new package is checked against all of the packages represented in the package database. This continual updating process ensures increased compatibility between all audited software packages.

If the target package did not pass the audit, it is determined whether the rule violations detected in the audit were acceptable in step 420. If the violations are not acceptable, the developer of the target package must revise the package to achieve conformance with the violated rules, as shown at step 424. If the violations are acceptable, then an exception file may be generated automatically from the audit report file, at step 422. If an exception file already exists, then the existing exception file is updated with entries to cover the detected violations. The generated/updated exception file may then be used as an external input file in a subsequent audit operation of the target package.

As mentioned above, an audit operation may consist of checking multiple packages in a single release against each other. For example, each package in a product release may be audited against all other packages in the product release prior to releasing the product. In such situations, the steps illustrated in FIG. 4 are performed for each package to be audited. For example, prior to the release of a product containing three packages (Pkg1, Pkg2 and Pkg3), a three-cycle audit operation may be performed. Pkg1, Pkg2 and Pkg3 are the target packages during the first, second and third cycles, respectively. During each cycle, the target package is check against itself and against the other two packages.

In the case where multiple packages rare checked, the audit report preferably includes a summary of the errors found in all of the checked packages. For example, the audit report may indicate the grand total number errors of each severity level that were detected during the audit of all of the checked packages.

As has been explained above, a highly-configurable audit system is provided. The audit system is configured for each audit by reading files maintained separate from the audit system. Thus, the programs which implement the audit system do not have to be modified and recompiled to cover the specific needs of each new audit operation. For example, external files may be used to designate (1) which audits rules are to be applied in a particular audit operation, (2) the severity level associated with each of the rules, (3) exceptions to the rules for the particular audit operation, and (4) the value of certain variables applicable to the audit operation. Even audit rules that are not implemented in the audit system may be specified. When such an audit rule applies, the audit system invokes an external routine which performs the checking required by the audit rule. The ability to use wildcard characters to specify exceptions allows a user to specify broad exceptions as well as narrow ones.

While specific embodiments of the present invention have been described, various modifications and substitutions will become apparent to one skilled in the art by this disclosure. Such modifications and substitutions are within the scope of the present invention, and are intended to be covered by the attached claims.

APPENDIX I

```
###################################################################

# @(#) sample.ipmod
# Sample Inter-Package Rule ID File
pkgmap_basename_ip_rt_1
pkgmap_basename_ip_rt_2
pkgmap_basename_ip_rt_3
pkgmap_basename_ip_rt_4
pkgmap_basename_ip_rt_5
pkgmap_basename_ip_rt_6
pkgmap_filetype_ip_rt_1
pkgmap_filetype_ip_rt_2
pkgmap_filetype_ip_rt_3
pkgmap_mode_ip_sun_1
pkgmap_owner_ip_sun_1
pkgmap_path_ip_rt_1
pkgmap_path_ip_rt_2
pkgmap_path_ip_rt_3
pkgmap_path_ip_rt_4
pkgmap_sizechksum_ip_sun_1
###################################################################

# @ (#) sample.spmod
# Sample Single-Package Rule ID File

###################################################################
# Copyright audits.
cprt_info_1
cprt_curryear_sp_sun_1
# Depend audits.
depend_arch_sp_rt_1
depend_arch_sp_abi_1
depend_type_sp_abi_1
depend_type_sp_abi_2
depend_name_sp_sun_1
depend_pkg_sp_sun_1
depend_pkg_sp_abi_1
depend_version_sp_abi_1
# Pkginfo audits.
pkginfo_arch_sp_abi_1
pkginfo_basedir_sp_sun_1
pkginfo_category_sp_abi_1
pkginfo_category_sp_abi_2
pkginfo_desc_sp_sun_1
pkginfo_desc_sp_abi_1
pkginfo_email_sp_sun_1
pkginfo_email_sp_abi_1
pkginfo_hotline_sp_sun_1
pkginfo_hotline_sp_abi_1
pkginfo_istates_sp_sun_1
pkginfo_maxinst_sp_sun_1
pkginfo_maxinst_sp_abi_1
pkginfo_name_sp_abi_1
pkginfo_name_sp_abi_2
pkginfo_pkg_sp_abi_1
pkginfo_pkg_sp_abi_2
pkginfo_predepend_sp_sun_1
pkginfo_predepend_sp_abi_1
pkginfo_prodname_sp_sun_1
pkginfo_prodvers_sp_sun_1
pkginfo_pstamp_sp_abi_1
pkginfo_rstates_sp_sun_1
pkginfo_rstates_sp_abi_1
pkginfo_ulimit_sp_abi_1
pkginfo_vendor_sp_sun_1
pkginfo_vendor_sp_abi_1
pkginfo_version_sp_abi_1
pkginfo_vstock_sp_abi_1
# Pkgmap audits.
pkgmap_class_sp_abi_1
pkgmap_class_sp_abi_2
pkgmap_group_sp_sun_1
pkgmap_group_sp_abi_1
pkgmap_major_sp_rt_1
pkgmap_minor_sp_rt_1
pkgmap_mode_sp_sun_1
pkgmap_mode_sp_sun_2
pkgmap_mode_sp_abi_1
pkgmap_owner_sp_sun_1
```

APPENDIX I-continued

```
pkgmap_owner_sp_rt_1
pkgmap_owner_sp_abi_1
pkgmap_pathname_sp_sun_1
pkgmap_pathname_sp_rt_1
pkgmap_size_sp_abi_1
pkgmap_ftype_sp_sun_1
pkgmap_volume_sp_rt_1
```

APPENDIX II

```
################################################################

# @ (#) sample.ex
# Sample Exception File

################################################################

pkgmap_basename_ip_rt_5|s100|SUNWastl/usr/aset/tasks/eeprom
pkgmap_basename_ip_rt_5|s100|SUNWkvm|/usr/kvm/eeprom

pkgmap_basename_ip_rt_5|s101|SUNWastl/usr/aset/tasks/env
pkgmap_basename_ip_rt_5|s101|SUNWcsu|/usr/bin/env

pkgmap_basename_ip_rt_5|s102|SUNWcsu|/usr/lib/fs/ufs/ff
pkgmap_basename_ip_rt_5|s102|SUNWlpu|/usr/lib/font/devpost/charlib/f
f
pkgmap_basename_ip_rt_5|s102|SUNws53|/usr/lib/fs/s5fs/ff
pkgmap_basename_ip_rt_5|s102|SUNWlpu|/usr/lib/font/devpost/charlib/f
f

pkgmap_basename_ip_rt_6|s103|SPROcpl|/opt/SUNWspro/SC2.0.1/include/C
C/common.h
pkgmap_basename_ip_rt_6|s103|SUNWheal/usr/include/inet/common.h
################################################################

# @ (#) sample.glex
# Sample Global Exception File

################################################################

# Audit exceptions:

# 1) Any records under */openwin/share/src/* with anything else
pkgmap_basename_*|g1|*|*/openwin/share/src/*
pkgmap_basename_*|g1|*|*
# 2) Any two records located under */openwin/share/include/*
pkgmap_basename_*|g2|*|*/openwin/share/include/*
pkgmap_basename_*|g2|*|*/openwin/share/include/*
# 3) man pages
pkgmap_basename_*|g3.0|SUNWman.*|*
pkgmap_basename_*|g3.0|*|*/intro*
pkgmap_basename_*|g3.1|SUNWman.*|*
pkgmap_basename_*|g3.1|*|*intro*
# 4) help files
pkgmap_basename_*|g4.1|*|*/HELP/*
pkgmap_basename_*|g4.1|*|*
pkgmap_basename_*|g4.2|*|*/help/*
pkgmap_basename_*|g4.2|*|*
# 5) font files
pkgmap_basename_*|g5.0|*|*/font/*
pkgmap_basename_*|g5.0|*|*/font/*
pkgmap_basename_*|g5.1|*|*/fonts/*
pkgmap_basename_*|g5.1|*|*/fonts/*
```

APPENDIX III

```
################################################################

# @ (#) sample.log
# Sample Audit Report

################################################################
audit: === LOG DATE Mon Dec 20 08:46:44 1993 ===
-----------------------------------------------------------------
SUNWcsd audit in progress, please wait ...
SUNWcsd inter-package audit in progress, please wait ...
```

APPENDIX III-continued

```
pass : rejects=0 mustfixes=0 warnings=0 (SUNWcsd)
audit: updating database ...
audit: *** update successful - no errors ***
----------------------------------------------------------------
SUNWcsft audit in progress, please wait ...
REJECT: CATEGORY must include (syslapp) <pkginfo_cat_sp_abi_3>
  pkginfo: CATEGORY=ALE
  CATEGORY is a comma seperated field which must include
  at least 'system' or 'application°' in its definition.
SUNWcsft inter-package audit in progress, please wait ...
ERROR: REJECTS=1 MUSTFIXES=0 WARNINGS=0 (SUNWcsft)
audit: FAILED AUDIT - NO CHANGES MADE
----------------------------------------------------------------
SUNWcsr audit in progress, please wait ...
SUNWcsr inter-package audit in progress, please wait ...
pass : rejects=0 mustfixes=0 warnings=0 (SUNWcsr)
audit: updating database ...
audit: *** update successful - no errors ***
----------------------------------------------------------------
SUNwcsu audit in progress, please wait ...
SUNWcsu inter-package audit in progress, please wait ...
REJECT: redundancy, same sums and attributes <pkgmap_path_ip_rt_2>
  --- row in question: ---
  SUNwcsu /usr/sbin/df 1 f none ... 0555 bin bin 21400 38357
  --- rows in conflict: ---
  SUNWscpu /usr/ucb/df 1 f none ... 0555 bin bin 21400 38357
ERROR: REJECTS=1 MUSTFIXES=0 WARNINGS=0 (SUNWcsu)
audit: FAILED AUDIT_NO CHANGES MADE
----------------------------------------------------------------
SUNWsvvs audit in progress, please wait ...
REJECT: PKG must exist in release <depend_pkg_ip_rt_1>
  P SUNWcar Core Architecture, (Root)
  P SUNWkvm Core Architecture, (Kvm)
SUNWsvvs inter-package audit in progress, please wait ...
ERROR: REJECTS=1 MUSTFIXES=0 WARNINGS=0 (SUNWsvvs)
audit: FAILED AUDIT - NO CHANGES MADE
----------------------------------------------------------------
audit: *** PKG SUMMARY: SUCCESS=2 FAILURES=3 ***
audit: done
audit: === ELAPSED TIME 0 hr 0 min 21 sec ===
```

What is claimed is:

1. A system for determining whether a target software package conforms to a plurality of packaging rules, the system comprising:

an applicable information retrieval unit for retrieving rule information from at least one external input file, wherein said at least one external input file resides external to the system, wherein said rule information indicates said plurality of packaging rules;

a target package information retrieval unit for retrieving information describing said target software package from at least one target package information file;

a package analyzer operatively coupled to said applicable information retrieval unit and said target package information retrieval unit, wherein the package analyzer determines whether said target software package conforms to said plurality of package rules based on said retrieved plurality of packaging rules and said retrieved information describing said target software package; and an audit report generation unit operatively coupled to the package analyzer, the audit report generation unit generating data indicative of whether said target software package conforms to said plurality of packaging rules.

2. The system of claim 1 wherein:

the plurality of packaging rules includes a set of single-package rules;

the package analyzer includes a single-package rule analyzer operatively coupled to said applicable information retrieval unit and said target package information retrieval unit; and the single-package rule analyzer determines whether said target software package conforms to said set of single-package rules based on said set of single-package rules and said information describing said target software package.

3. The system of claim 2 wherein:

the plurality of packaging rules includes a set of inter-package rules;

the system further comprises an external package information retrieval unit for retrieving information describing at least one software package other than said target software package;

the package analyzer includes an inter-package rule analyzer operatively coupled to said applicable information retrieval unit, said target package information retrieval unit and said external package information retrieval unit;

the inter-package rule analyzer determines whether said target software package conforms to said set of inter-package rules based on said set of inter-package rules, said information describing said target software package and said information describing said at least one target software package other than said target software package.

4. The system of claim 3 wherein the external package information retrieval unit retrieves said information describing at least one software package other than said target software package from a software package database containing information on a plurality of software packages other than said target software package.

5. The system of claim 4 wherein the system includes a software package database update unit for updating the software package database to include information about the target software package.

6. The system of claim 1 wherein the audit report generation unit generates data indicative of which rules of said plurality of packaging rules are violated by said target software package.

7. The system of claim 6 wherein the audit report generation unit generates data indicating a severity classification of any violations of said plurality of packaging rules.

8. The system of claim 1 wherein:

the applicable information retrieval unit retrieves exception information from at least one exception file;

the system further comprises an applicable exception unit operatively coupled to the applicable information retrieval unit;

the applicable exception unit determines exceptions to said plurality of packaging rules based upon said exception information;

the system further comprises an exception analyzer operatively coupled to the applicable exception unit;

the exception analyzer determines whether a violation of a packaging rule of said plurality of packaging rules is permitted by said exceptions;

the audit report generation unit generates data to indicate that said target software package does not conform to said packaging rule of said plurality of packaging rules if said packaging rule is violated by said target software package and said violation of said packaging rule is not permitted by any of said exceptions.

9. The system of claim 1 wherein each packaging rule of said plurality of packaging rules has an associated severity of violation.

10. The system of claim 9 wherein the package analyzer determines that said target software package conforms to said plurality of packaging rules if said target software package does not violate any rule of said plurality of packaging rules having a severity level greater than a predetermined severity level.

11. A method for determining whether a target software package conforms to a plurality of packaging rules, the method comprising the steps of:

retrieving rule information from at least one external input file, wherein said rule information indicates said plurality of packaging rules;

retrieving information describing said target software package from at least one target package information file;

determining whether said target software package conforms to said plurality of packaging rules based on said retrieved plurality of packaging rules and said retrieved information describing said target software package; and generating data indicative of whether said target software package conforms to said plurality of packaging rules.

12. The method of claim 11 wherein:

the plurality of packaging rules includes a set of single-package rules, the step of determining whether said target software package conforms to said plurality of packaging rules includes determining whether said target software package conforms to said set of single-package rules based on said set of single-package rules and said information describing said target software package.

13. The method of claim 12 wherein: the plurality of packaging rules includes a set of inter-package rules;

the method further includes the step of retrieving information describing at least one software package other than said target software package;

the step of determining whether said target software package conforms to said set of package rules includes determining whether said target software package conforms to said set of inter-package rules based on said set of inter-package rules, said information describing said target software package and said information describing said at least one target software package other than said target software package.

14. The method of claim 13 wherein the step of retrieving information describing at least one software package other than said target software package includes retrieving information from a package database.

15. The method of claim 11 wherein the step of generating data includes generating data indicative of which rules of said plurality of packaging rules are violated by said target software package.

16. The method of claim 15 wherein the step of generating data includes generating data indicating a severity classification of any violations of said plurality of packaging rules.

17. The method of claim 11 further including the steps of:

retrieving exception information from at least one exception file;

determining exceptions to said plurality of packaging rules based upon said exception information; and wherein the step of generating data includes generating data to indicate that said target software package violated a packaging rule of said plurality of packaging rules if said target software package violates said packaging rule and violation of said packaging rule is not allowed by any of said exceptions.

18. The method of claim 11 further including the step of generating an exception file based on said data indicative of whether said target software package conforms to said plurality of packaging rules, the exception file including exception information corresponding to a rule of said plurality of packaging rules that was violated by said target software package.

19. The method of claim 11 wherein:

the plurality of packaging rules includes a set of internally implemented rules;

the step of determining whether said target software package conforms to said plurality of packaging rules is performed by an audit system; and the step of determining whether said target software package conforms to said plurality of packaging rules includes the step of invoking routines that are implemented in said audit system.

20. The method of claim 11 wherein:

the plurality of packaging rules includes a set of externally-implemented rules;

the step of determining whether said target software package conforms to said plurality of packaging rules is performed by an audit system; and the step of determining whether said target software package conforms to said plurality of packaging rules includes the step of invoking routines implemented in software modules external to said audit system.

* * * * *